United States Patent
Doane

(10) Patent No.: US 11,356,514 B2
(45) Date of Patent: Jun. 7, 2022

(54) ARRANGEMENTS FOR DETECTING BI-DIRECTIONAL ARTIFICIAL INTELLIGENCE (AI) VOICE COMMUNICATIONS AND NEGOTIATING DIRECT DIGITAL COMMUNICATIONS

(71) Applicant: Capital One Services, LLC, McLean, VA (US)

(72) Inventor: Andrew Doane, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/995,238

(22) Filed: Aug. 17, 2020

(65) Prior Publication Data

US 2020/0382606 A1    Dec. 3, 2020

Related U.S. Application Data

(63) Continuation of application No. 16/277,149, filed on Feb. 15, 2019, now Pat. No. 10,785,314.

(51) Int. Cl.
| | | |
|---|---|---|
| *H04L 67/141* | (2022.01) | |
| *H04M 3/51* | (2006.01) | |
| *H04W 4/14* | (2009.01) | |
| *H04L 65/1069* | (2022.01) | |
| *H04M 3/42* | (2006.01) | |

(52) U.S. Cl.
CPC ........ *H04L 67/141* (2013.01); *H04M 3/5166* (2013.01); *H04W 4/14* (2013.01); *H04L 65/1069* (2013.01); *H04M 3/42178* (2013.01)

(58) Field of Classification Search
CPC . H04L 65/1059; H04L 67/143; H04L 67/141; H04L 69/22; H04L 65/1069; H04W 4/14; H04W 4/00; H04W 4/80; H04M 3/4935; H04M 3/5166; H04M 3/42178; H04M 2203/2027
See application file for complete search history.

(56) References Cited

U.S. PATENT DOCUMENTS

| | | | | |
|---|---|---|---|---|
| 7,006,614 | B2* | 2/2006 | Feinberg | H04M 3/42 379/156 |
| 2009/0059818 | A1* | 3/2009 | Pickett | H04L 65/1069 370/259 |
| 2009/0217039 | A1* | 8/2009 | Kurapati | H04L 63/1441 713/168 |
| 2010/0093330 | A1* | 4/2010 | Bluvband | H04M 3/50 455/417 |
| 2014/0219132 | A1* | 8/2014 | Delveaux | H04L 12/4035 370/254 |

* cited by examiner

*Primary Examiner* — Oussama Roudani
(74) *Attorney, Agent, or Firm* — KDB

(57) ABSTRACT

Arrangements for automatically detecting bi-directional artificial intelligence (AI) communications and automatically negotiating (i.e., switching to alternative) direct digital communications.

20 Claims, 9 Drawing Sheets

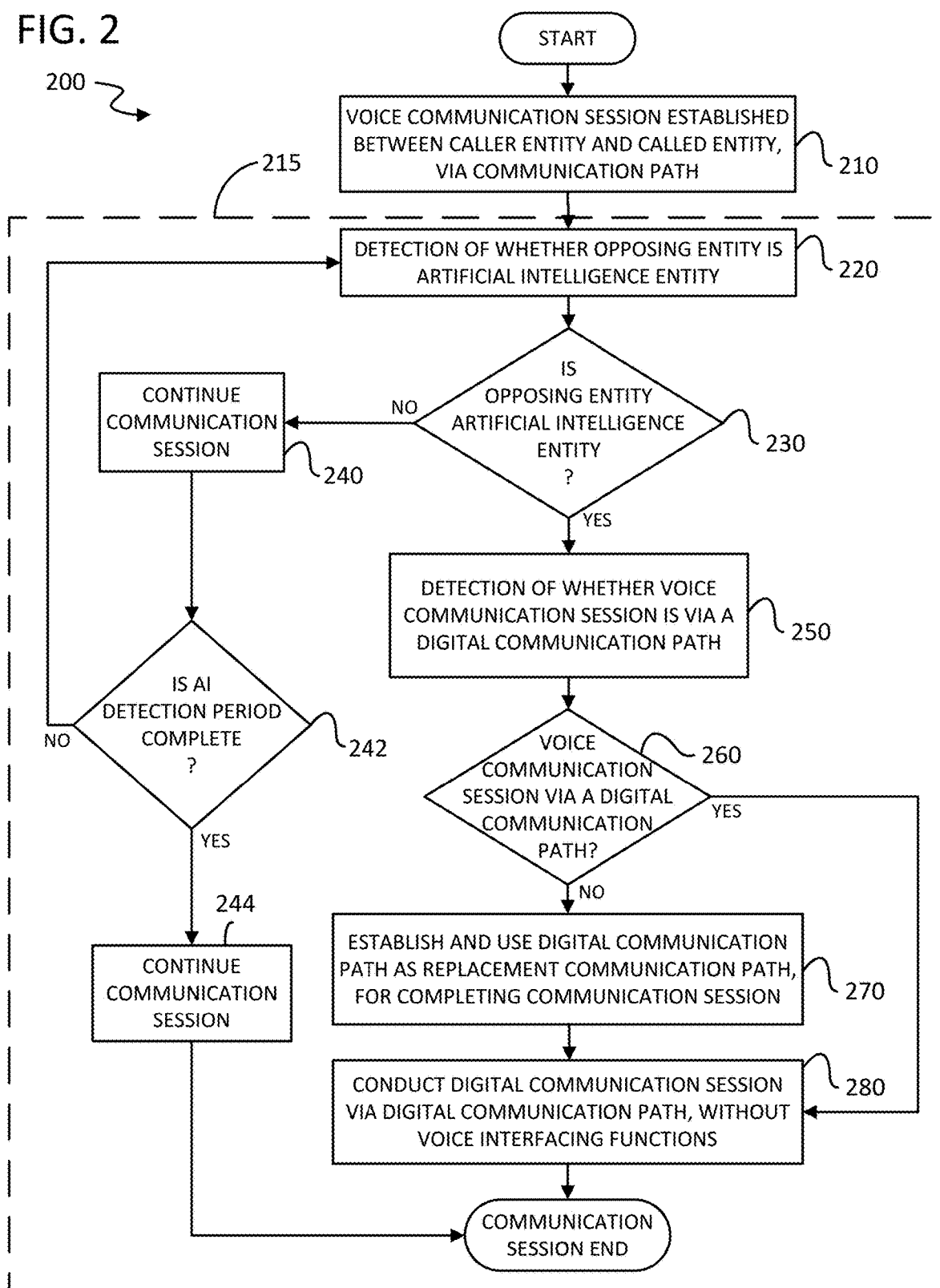

500

600

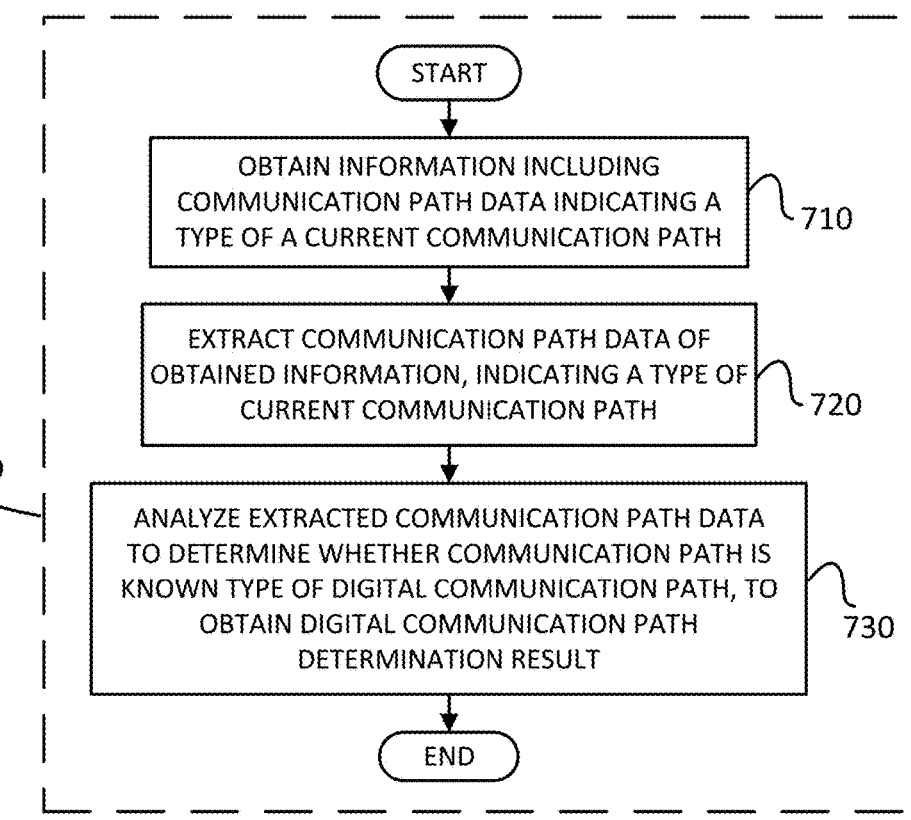
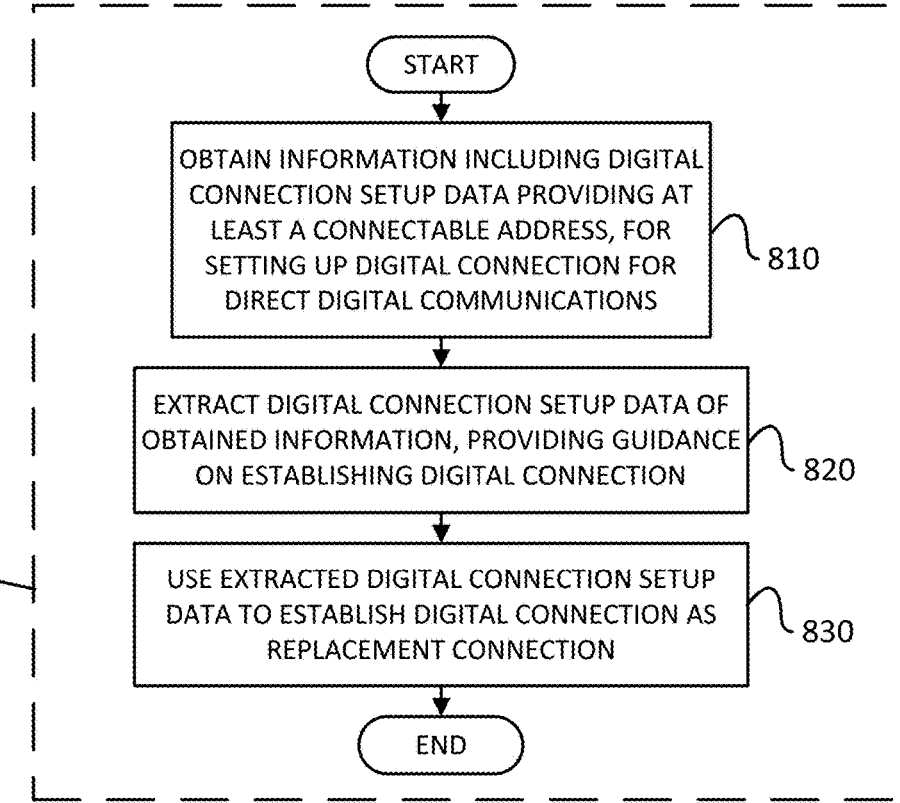

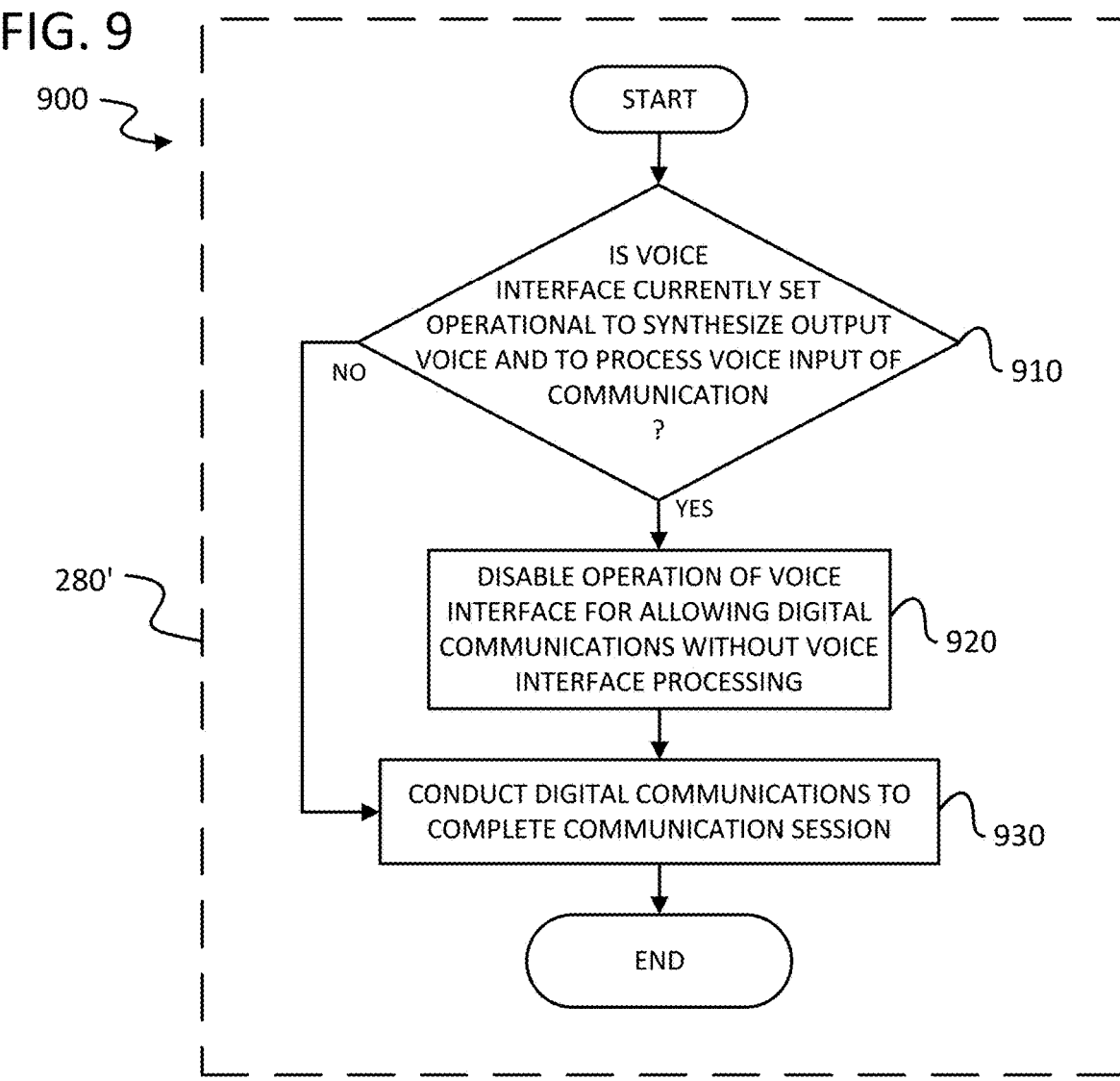

FIG. 10

Non-Transitory Storage Medium 1000

Computer Executable Instructions for 200

Computer Executable Instructions for 600

Computer Executable Instructions for 700

Computer Executable Instructions for 800

Computer Executable Instructions for 900

Computer Executable Instructions for ...

Data

ARRANGEMENTS FOR DETECTING BI-DIRECTIONAL ARTIFICIAL INTELLIGENCE (AI) VOICE COMMUNICATIONS AND NEGOTIATING DIRECT DIGITAL COMMUNICATIONS

RELATED APPLICATIONS

This application is a continuation of U.S. patent application Ser. No. 16/277,149, filed Feb. 15, 2019, titled "ARRANGEMENTS FOR DETECTING BI-DIRECTIONAL ARTIFICIAL INTELLIGENCE (AI) VOICE COMMUNICATIONS AND NEGOTIATING DIRECT DIGITAL COMMUNICATIONS". The contents of the aforementioned application are incorporated herein by reference in their entirety.

TECHNICAL FIELD

Examples described herein are generally related to arrangements for automatically detecting bi-directional artificial intelligence (AI) communications and automatically negotiating (i.e., switching to alternative) direct digital communications.

BACKGROUND

Users (e.g., private persons; companies; educational institutions; governmental entities; etc.) have been trending towards using AI virtual assistants which use a natural-language interface and are capable of: recognizing a spoken (i.e., voiced) natural-language of a speaking entity: reacting to a content (e.g., command or query) of the spoken language to invoke and perform actions; and returning a result back to the speaking entity. That is, the AI virtual assistant is able to listen for and recognize voice statements or queries, perform actions, answer questions, make recommendations, etc. One example action might include fulfilling requests via interacting with an opposing party across a communication session (e.g., a voice telephone call). One specific non-limiting action might be calling a restaurant or hotel to make a reservation.

That is, rather than a user (e.g., private person) making a telephone call himself/herself, the user might instead issue a voice command to his/her AI virtual assistant, to invoke the AI virtual assistant to telephone a specific restaurant or hotel to make the reservation. The AI virtual assistant would recognize the voice command, make and establish a telephone connection to the restaurant or hotel, and then utilize its provided natural-language interface to voice communicate with the answering party. The natural-language interface might be configured to synthesize a human voice which is so highly refined (in tone, inflection, content, accent, etc.) that the answering party might be unable to detect that the calling party talking is an AI virtual assistant, and not a human. Once the reservation is made, the AI virtual assistant communicates the particulars of the reservation back to the user, e.g., using any of voice, text, email, etc.

As AI virtual assistant usage becomes more-and-more prevalent, there may occur an instance where both calling and called ends of a voice communication session (e.g., telephone call) are each being conducted by respective AI virtual assistants. That is, a calling AI virtual assistant and a called AI virtual assistant might be communicating back-and-forth using voice communications. Disadvantages arise from back-and-forth voice communications between opposing AI virtual assistants which are digitally-based.

For example, each AI virtual assistant must expend time/resources (e.g., processing time; processing bandwidth; energy) both to synthesize an outgoing voice (e.g., via digital-to-analog (D/A) conversion; look-up table; etc.), and to decipher an incoming voice (e.g., via analog-to-digital (A/D) conversion, pattern recognition, etc.). Further, it is inevitable that an incoming voice might occasionally be mis-deciphered or in-decipherable. For example, background sounds, static, noise, etc., might have masked, distorted or clouded a quality of the incoming voice. In short, there is inefficiency in having two digitally-based AI virtual assistants communicating back-and-forth with each other using voice communications.

What is needed are arrangements for automatically detecting instances of bi-directional artificial intelligence (AI) voice communications, and automatically invoking a switchover to direct digital communications between AI entities.

SUMMARY

Provided are arrangements for automatically detecting bi-directional artificial intelligence (AI) communications and automatically negotiating direct digital communications.

That is, example first embodiments are directed to a method of negotiating direct digital communication between artificial intelligence (AI) entities, comprising: recognizing, by an AI entity on a first side of a bi-directional voice communication session, a predetermined indicator provided from an opposing side of the bi-directional voice communication session, indicative of a second AI entity on the opposing side conducting the bi-directional voice communication session; responsive to recognition of the second AI entity, utilizing a predetermined protocol to negotiate connection information for a direct digital communication session between the AI entity and the second AI entity; terminating the bi-directional voice communication session between the AI entity and the second AI entity after the connection information for the direct digital communication session have been negotiated; and utilizing the connection information to establish the direct digital communication session between the AI entity and the second AI entity.

In example second embodiments based on the first embodiments, the bi-directional voice communication session includes an in-band communication channel and out-of-band communication channel; the predetermined indicator is recognized from the in-band communication channel.

In example third embodiments based on the second embodiments, the predetermined indicator recognized from the in-band communication channel is at least one item selected from a list of: a predetermined tone; a predetermined tone which is imperceptible to human hearing; a predetermined audible pattern; a predetermined AI voice; a predetermined AI salutation; and a predetermined AI phrase.

In example fourth embodiments based on the first embodiments, the bi-directional voice communication session includes an in-band communication channel and out-of-band communication channel; and the predetermined indicator is recognized from the out-of-band communication channel.

In example fifth embodiments based on the fourth embodiments, the predetermined indicator recognized from the out-of-band communication channel is at least one item selected from a list of: a predetermined caller identification (ID) number; a predetermined caller ID string portion; a predetermined caller ID prefix; a predetermined caller ID area code; a predetermined caller ID text sequence; a predetermined text sequence; and a predetermined header portion.

In example sixth embodiments based on the first embodiments, the connection information for the direct digital communication session, is at least one of listed items of: a uniform resource locator (URL) useable to establish the direct digital communication session; a token useable to authorize the direct digital communication session; an identification (ID) token to identify at least one of the AI entity and the second AI entity; and a protocol to be used in conducting the direct digital communication session.

Example seventh embodiments are directed to a method of negotiating direct digital communication between artificial intelligence (AI) entities, comprising: recognizing, by an AI entity on a first side of a bi-directional voice communication session, a predetermined indicator provided from an opposing side of the bi-directional voice communication session, indicative of a second AI entity on the opposing side conducting the bi-directional voice communication session at a called-number; terminating the bi-directional voice communication session between the AI entity and the second AI entity after recognition of the second AI entity on the opposing side; responsive to recognition of the second AI entity, utilizing the called-number to poll a predetermined look-up facility to determine connection information for a direct digital communication session between the AI entity and the second AI entity; and utilizing the connection information to establish the direct digital communication session between the AI entity and the second AI entity.

In example eighth embodiments based on the seventh embodiments, the bi-directional voice communication session includes an in-band communication channel and out-of-band communication channel; and the predetermined indicator is recognized from the in-band communication channel.

In example ninth embodiments based on the eighth embodiments, the predetermined indicator recognized from the in-band communication channel is at least one item selected from a list of: a predetermined tone; a predetermined tone which is imperceptible to human hearing; a predetermined audible pattern; a predetermined AI voice; a predetermined AI salutation; and a predetermined AI phrase.

In example tenth embodiments based on the seventh embodiments, the bi-directional voice communication session includes an in-band communication channel and out-of-band communication channel; and the predetermined indicator is recognized from the out-of-band communication channel.

In example eleventh embodiments based on the tenth embodiments, the predetermined indicator recognized from the out-of-band communication channel is at least one item selected from a list of: a predetermined caller identification (ID) number; a predetermined caller ID string portion; a predetermined caller ID prefix; a predetermined caller ID area code; a predetermined caller ID text sequence; a predetermined text sequence; and a predetermined header portion.

In example twelfth embodiments based on the seventh embodiments, the connection information for the direct digital communication session, is at least one of listed items of: a uniform resource locator (URL) useable to establish the direct digital communication session; a token useable to authorize the direct digital communication session; an identification (ID) token to identify at least one of the AI entity and the second AI entity; and a protocol to be used in conducting the direct digital communication session.

In example thirteenth embodiments based on the seventh embodiments, the called-number is more particularly a called-telephone-number; and the predetermined look-up facility utilizes the called-telephone-number and a look-up table (LUT) to determine the connection information for the direct digital communication session between the AI entity and the second AI entity.

In example fourteenth embodiments based on the seventh embodiments, the predetermined look-up facility is at least one of listed facilities of: a predetermined native look-up facility maintained as a component of the AI entity; a predetermined remote look-up facility maintained remote from the AI entity; and a predetermined centralized look-up facility accessible via a predetermined URL.

Example fifteenth embodiments are directed to an artificial intelligence (AI) entity comprising: a hardware processor, a non-transitory processor-readable memory embodying code which, when executed by the processor, causes the processor to: recognize, on a first side of a bi-directional voice communication session, a predetermined indicator provided from an opposing side of the bi-directional voice communication session, indicative of a second AI entity on the opposing side conducting the bi-directional voice communication session; responsive to recognition of the second AI entity, utilize a predetermined protocol to negotiate connection information for a direct digital communication session between the AI entity and the second AI entity; terminate the bi-directional voice communication session with the second AI entity after the connection information for the direct digital communication session have been negotiated; and utilize the connection information to establish the direct digital communication session between the AI entity and the second AI entity.

In example sixteenth embodiments based on the fifteenth embodiments, the bi-directional voice communication session includes an in-band communication channel and out-of-band communication channel; and the predetermined indicator is recognized from the in-band communication channel.

In example seventeenth embodiments based on the sixteenth embodiments, the predetermined indicator recognized from the in-band communication channel is at least one item selected from a list of: a predetermined tone; a predetermined tone which is imperceptible to human hearing; a predetermined audible pattern; a predetermined AI voice; a predetermined AI salutation; and a predetermined AI phrase.

In example eighteenth embodiments based on the fifteenth embodiments, the bi-directional voice communication session includes an in-band communication channel and out-of-band communication channel; the predetermined indicator is recognized from the out-of-band communication channel.

In example nineteenth embodiments based on the eighteenth embodiments, the predetermined indicator recognized from the out-of-band communication channel is at least one item selected from a list of: a predetermined caller identification (ID) number; a predetermined caller ID string portion; a predetermined caller ID prefix; a predetermined caller ID area code; a predetermined caller ID text sequence; a predetermined text sequence; and a predetermined header portion.

In example twentieth embodiments based on the fifteenth embodiments, the connection information for the direct digital communication session, is at least one of listed items of: a uniform resource locator (URL) useable to establish the direct digital communication session; a token useable to authorize the direct digital communication session; an identification (ID) token to identify at least one of the AI entity and the second AI entity; and a protocol to be used in conducting the direct digital communication session.

It is to be understood that both the foregoing general description and the following detailed description are exemplary and explanatory only and are not restrictive of the disclosed embodiments, as claimed.

BRIEF DESCRIPTION OF THE DRAWINGS

FIG. 2 illustrates an example flow chart algorithm conducted by at least one party of the FIG. 1 example architecture.

FIG. 7 illustrates another example flow chart algorithm substitutable for another portion of the FIG. 2 flow chart algorithm.

FIG. 8 illustrates yet another example flow chart algorithm substitutable for yet another portion of the FIG. 2 flow chart algorithm.

FIG. 9 illustrates still another example flow chart algorithm substitutable for still another portion of the FIG. 2 flow chart algorithm.

FIG. 10 illustrates an example embodiment of a storage medium.

DETAILED DESCRIPTION

Reference will now be made in detail to the disclosed embodiments, examples of which are illustrated in the accompanying drawings.

Figure 1:
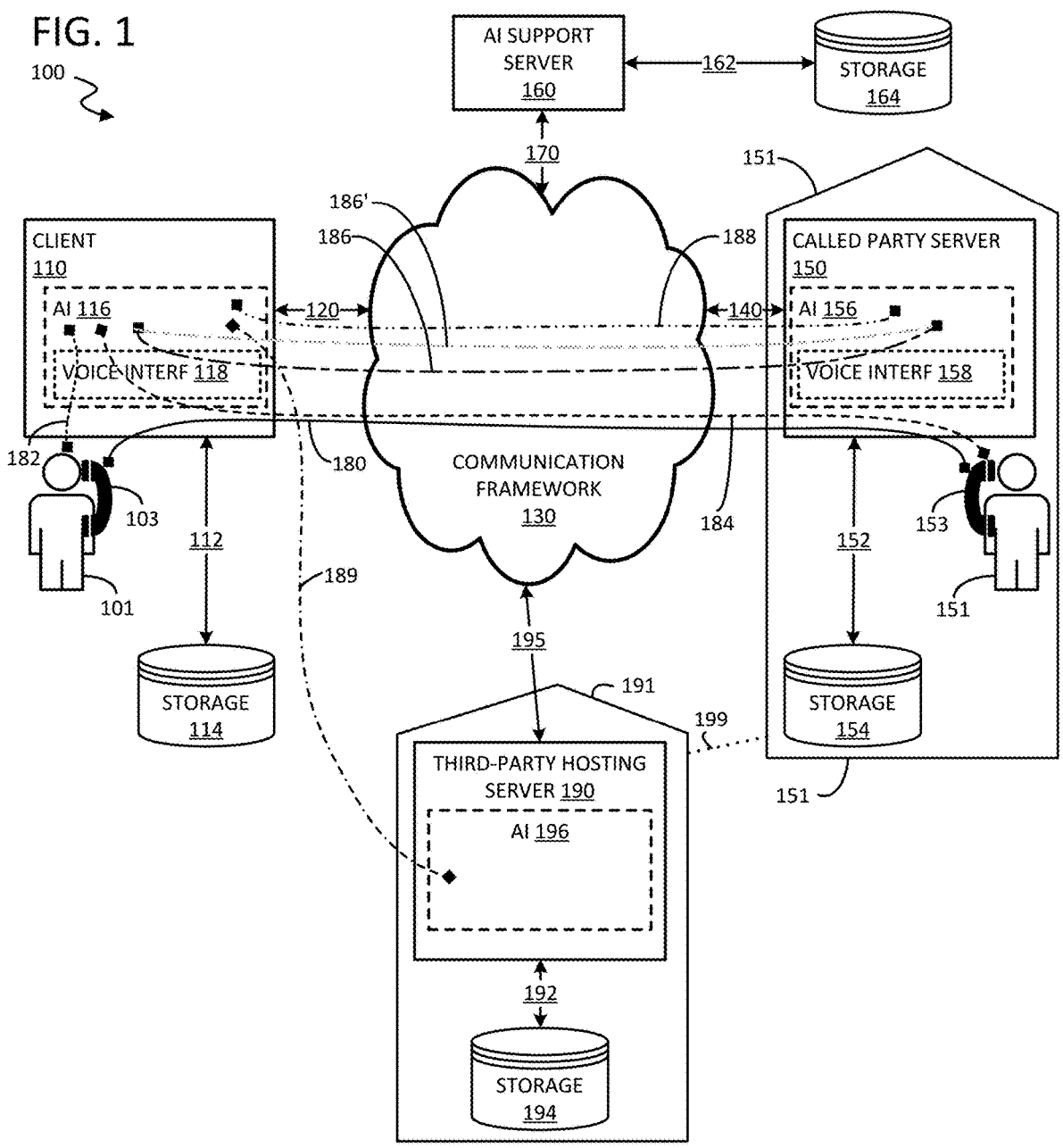
FIG. 1 illustrates a block diagram example of a communication architecture (e.g., networked system) facilitating two-party (e.g., caller party and called party) communications.

FIG. 1 is a block diagram of communication architecture 100 (e.g., networked system) which facilitates two-party (e.g., caller or calling party verses called party) communications. Components in architecture 100 may be configured for performing an automatic detecting of instances of bi-directional artificial intelligence (AI) voice communications, and automatic invoking of a switchover to direct digital communications, consistent with disclosed embodiments. The embodiments, however, are not limited to implementation by the communications architecture 100.

As shown in FIG. 1, the communications architecture 100 includes one or more clients 110, one or more called party servers 150, and one or more AI support servers 160, and may (in some embodiments) include a third-party hosting server 190. While only one client 110, called party server 150, AI support server 160 and third-party hosting server 190 are shown for sake of simplicity and brevity, it will be understood that architecture 100 may include more than one of any of these components. That is, the components and arrangement of the components included in architecture 100 may vary. Further, architecture 100 may include other components that perform or assist in the performance of one or more processes consistent with the disclosed embodiments.

In further detail, the client 110, called party server 150, AI support server 160 and third-party hosting server 190 are operatively connected to one another via combinations of paths 120, 140, 170 and 195, and communication framework 130. The paths 120, 140, 170 and 195 may be any type of hardwired, wireless, optical, etc. path(s), or combination thereof. Further, client 110, called party server 150, AI support server 160 and third-party hosting server 190 are illustrated connected to one or more respective client data storage 114, server data storage 154, AI support server data storage 164 and third-party data storage 194 via the paths 112, 152, 162 and 192, respectively.

While illustrated as being separate from the client 110, called party server 150, AI support server 160 and third-party hosting server 190, the client data storage 114, server data storage 154, AI support server data storage 164 and third-party storage 194 may instead be at least partially embodied within the client 110, called party server 150, AI support server 160 and third-party hosting server 190, respectively (whereupon the paths 112, 152, 162 and 192 might be internal connections (e.g., buses, printed circuit board (PCB) trace lines, etc.)). Such storages can be employed to store information such as programs, applications, databases, cookies, etc. supportive of performing automatic detecting of instances of bi-directional artificial intelligence (AI) voice communications, and automatic invoking of a switchover to direct digital communications, consistent with disclosed embodiments. The paths 112, 152, 162 and 192 may be any type of hardwired, wireless, optical, etc. path(s), or combination thereof.

Ones of the client 110, client data storage 114, called party server 150, server data storage 154, AI support server 160, AI support server data storage 164, third-party hosting server 190 and third-party storage 194 may exist at differing geographic locations. For example, the client 110 and client data storage 114 might be maintained at a residence, business, etc., or on a person of the user 101 (e.g., user's cell phone). The called party server 150 and server data storage 154 might be maintained at a facility of a company 151 (e.g., restaurant; hotel) or at some other third-party server provider type of facility 191 (e.g., server farm) per contract (shown representatively by dotted line 199) between the company and a third-party server provider. The AI support server 160 and AI support server data storage 164 might be maintained at a facility of an AI support repository, clearinghouse, association, etc., or at a third-party server provider type of facility (e.g., server farm) per contract between the AI support association and a third-party server provider. Finally, the third-party hosting server 190 and third-party storage 194 may be maintained at a third-party server provider type of facility 191 (e.g., server farm).

The client 110, called party server 150, AI support server 160 and third-party hosting server 190 may communicate information between each other via the communication framework 130. The communications framework 130 may implement any well-known communications techniques and protocols. As non-limiting examples, the communications framework 130 may be implemented as a packet-switched network (e.g., public networks like the Internet, private networks like an enterprise intranet, and so forth), a circuit-switched network (e.g., public switched telephone network (PSTN)), or a combination thereof and other networks.

Any network forming part of the communications framework 130 may implement various network interfaces arranged to accept, communicate, and connect to another network. A network interface may be regarded as a specialized form of an input-output interface. Network interfaces may employ connection protocols including without limitation: direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types.

For example, multiple network interfaces may be employed to allow for the communication over broadcast, multicast, and unicast networks. Still further, communications network may be any one or combination of wired and/or wireless networks including without limitation: a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Alternatively, at least a portion of the communication framework 130 may in some embodiments, be considered a "cloud". The term "cloud" is a shorthand reference to cloud computing infrastructure. The cloud includes one or more communication networks, such as the Internet, for example, and can further include portions of an industrial communications network, such as a local area network (LAN) or a wide area network (WAN). In cloud computing, a computing process may run on one or many connected cloud computers at the same time. In cloud computing, the cloud can host and run an application anywhere in the world. Further, the cloud enables access to the application from anywhere. Still further, the cloud may include a network or association of connected computer devices and digital electronic resources that can be used to perform processing and to relay communications.

Returning to FIG. 1, the client 110 may also be termed as a first computing device associated with a user 101. Although a real-life practical system would include many clients and computing devices, only a single client and computing device is being illustrated and described in FIG. 1 for the sake of simplicity and brevity. The first computing device may be configured to execute, among other programs, an AI application 116 and a voice interface VOICE INTERF 118 application.

Any item termed as an "application" within this disclosure is not limited to existence as a single program and may be embodied via a plurality of (e.g., inter-cooperating) programs. The plurality of programs may all be embodied within a single component (e.g., device) provided at a single geographical location, or may be embodied in a disbursed manner in a plurality of components provided in locations geographically and/or communicatively distanced from one another.

That is, in some embodiments, the programs of the AI application 116 and/or the VOICE INTERF 118 application (as examples) may be embodied wholly within the client 110 device, the client data storage 114 or a combination of the client 110 device and client data storage 114. In other embodiments, at least a part of such programs may be embodied in the cloud via cloud computing, e.g., via a third-party technology company providing Internet-related services and products. For simplicity of illustration and description, applications and programs within this disclosure will be illustrated and described as being embodied and/or executed wholly within a single component (e.g., client 110 device) and at a single location.

The AI application 116 may be configured to operate as an AI virtual assistant which, in one example embodiment, can recognize commands input by a user, and perform assistive operations for the user responsive to recognized commands. A non-exhaustive list of assistive operations might include: search the Internet; check basic information; schedule events; make telephone calls; schedule alarms; scheduling reminders; adjust hardware settings on the user's device; play music; engage in two-way conversations. Commands may be input via natural voice, and/or via manual input (e.g., mouse; keyboard; buttons; switches).

The voice interface VOICE INTERF 118 application may be configured to perform voice synthesis and recognition, and may include a voice processing algorithm where linguistic phenomena such as verbs, phrases and clauses are recognized. The voice interface VOICE INTERF 118 may be versatile in that it may be configured to process voice inputted to it via any of plural differing input modes, e.g., microphone, telephone, VoIP, etc.

For the sake of simplicity and brevity, simple examples involving FIG. 1's user 101 desiring to secure a dining reservation at a restaurant will now be used for descriptions leading up to example embodiments of the present invention.

More particularly, as one non-AI approach, the user 101 may simply utilize a telephone 103 to manually place a call himself/herself and establish a phone call with the restaurant 151, as shown illustratively by the FIG. 1 call connection 180 (solid-black-line). The darkened square at the user 101 end of the call connection 180 illustratively shows that the call connection 180 is connected to the user 101's phone 103, and the darkened square at a restaurant 151 end illustratively shows that the call connection 180 is connected to a phone 153 of a restaurant staff person 151 (e.g., reservationist).

In a practical real-world implementation, the illustrated call connection 180 would actually involve many smaller connections of differing connection types along a connection from the phone 103 to the phone 153, and some of the smaller connections might be more analog-friendly (e.g., PSTN) connections as opposed to more digital-friendly (e.g., Internet) connections.

Of further interest, the call connection 180 may route through the client 110 of the user 101 and the called party server 150 of the restaurant as shown illustratively via the call connection 180's path traversing across the FIG. 1 client 110 and called party server 150 blocks. Once the call connection 180 is established, the user 101 and staff person 151 conduct voice communications until the agreement of a reservation date/time is reached. After the reservation is made, the AI virtual assistant communicates the particulars of the reservation back to the user, e.g., using any of voice, text, email, etc.

Next, a second example will be described where the user 101 uses AI 116 to secure the restaurant reservations. More particularly, the user 101 may initiate a voice conversation with the AI 116 as shown illustratively via the FIG. 1 connection 182 path (small dash line). The voice conversations via the connection path 182 includes handling via the VOICE INTERF 118 application, as shown illustratively by the call connection 182's path traversing across the VOICE INTERF 118 application block.

Any VOICE INTERF application mentioned and/or illustrated within this disclosure is configured to perform voice synthesis to help produce voice output as dictated by any AI application with which it is associated, and is configured to help with voice recognition and analysis regarding content of a voice input (whether received via a microphone input, telephone line, VoIP, etc.). In effect, the VOICE INTERF application acts as a computer-voice interface, for example, between a human (e.g., the user 101) and the AI application, thus allowing the human and AI application to communicate with each other via voice.

The user 101 may ask the AI 116 to "Please recommend a restaurant." The AI 116 utilizes its built-in intelligence and help from the VOICE INTERF 118 application to: recognize the voiced request; invoke a search of the Internet for nearby restaurants; select a proposed restaurant 151 according to a predetermined algorithm or criteria; and voice the proposed restaurant 151 to the user 101. Assuming the proposed restaurant 151 is agreeable, the user 101 may ask the AI 116 to "Make a reservation for Friday evening."

The AI 116 again utilizes its built-in intelligence and help from the VOICE INTERF 118 application to: recognize the voiced request; invoke a search of the Internet to determine a phone number of the accepted restaurant 151; and establish a phone call (shown illustratively using FIG. 1's call connection 184 (dashed black line)) to the accepted restaurant 151. The darkened square at the AI 116 end of the call connection 184 shows illustratively that the call connection 180 is connected to (i.e., handled by) the AI 116, and the darkened square at a restaurant 151 end shows illustratively that the call connection 180 is connected to the phone 153 of the restaurant staff person 151 (e.g., reservationist).

Again, in a practical real-world implementation, the illustrated call connection 184 may involve many smaller connections of differing connection types along a path thereof from the AI 116 to the phone 153, and some of the connections might be more analog-friendly (e.g., PSTN) connections as opposed to more digital-friendly (e.g., Internet) connections.

Further, voice components of the phone call along the call connection 184 are handled through the VOICE INTERF 118 application (previously described), thus allowing the human (restaurant staff member 151) and AI application (AI 116) to communicate with each other using voice. Of note, if the restaurant staff member 151 does not know in advance that the other end of the phone call is being conducted by an AI, and if the VOICE INTERF 118 application's synthesis of a human voice is sufficiently refined (in tone, inflection, content, accent, etc.), the answering party might be unable to detect that the calling party talking is an AI virtual assistant, and not a human. The user 101 and staff person 151 conduct voice communications until the agreement of a reservation date/time is reached. After the reservation is made, the AI 116 virtual assistant communicates the particulars of the reservation back to the user, e.g., using any of voice, text, email, etc.

A third example will be described where the user 101 uses AI 116 to secure the restaurant reservations, but this time the restaurant is also using an AI 156 (instead of the restaurant staff member 151) to handle the making of reservations. The details of the AI 156 are assumed to be the same as, or similar to, the details of the AI 116, and accordingly, description of such similar details of the AI 156 are omitted for the sake of brevity and economy. The AI 156, however, may further include a reservation-handling application (not shown) and reservation data may be maintained within a reservations database stored in the server data storage 154.

A process leading up to the making a phone call (to establish call connection 186 (long-short dashed line)) between the AI 116 and the AI 156 is the same as that described for the above second example involving connection 184, except for the following. More particularly, the connection path 186 is established instead of the call connection 184, and the connection path 186 includes handling via both the VOICE INTERF 118 and the VOICE INTERF 158 applications, as shown illustratively by the call connection 186 path traversing across the VOICE INTERF 118 and the VOICE INTERF 158 application blocks. Further, the darkened square at the AI 156 end of the call connection 186 shows illustratively that the call connection 186 is connected to (i.e., handled by) the AI 156, instead of the restaurant staff person 151 (e.g., reservationist).

Of note, if the AI 116 and AI 156 each do not know in advance that the other end of the phone call is being conducted by an AI, and if the VOICE INTERF applications' synthesis of a human voice is sufficiently refined (in tone, inflection, content, accent, etc.), the AI 116 and AI 156 conducting the call each might be unable to detect that the opposing party talking is an AI virtual assistant, and not a human. The AI 116 and AI 156 conduct voice communications until the agreement of a reservation date/time is reached. After the reservation is made, the AI 116 virtual assistant communicates the particulars of the reservation back to the user, e.g., using any of voice, text, email, etc.

As AI virtual assistant usage becomes more-and-more prevalent, there may occur an instance such as this, where both calling and called ends of a voice communication session (e.g., telephone call) are each being conducted by respective AI virtual assistants. That is, a calling AI virtual assistant and a called AI virtual assistant might be communicating back-and-forth using voice communications, without ever knowing that the opposing party is an AI virtual assistant talking, and not a human. As mentioned previously, disadvantages arise from back-and-forth voice communications between opposing AI virtual assistant entities.

For example, each AI virtual assistant must expend time/ resources (e.g., processing time; processing bandwidth; energy) both to synthesize an outgoing voice (e.g., via digital-to-analog (D/A) conversion; look-up tables; etc.), and to decipher an incoming voice (e.g., via analog-to-digital (A/D) conversion; pattern recognition; etc.). Further, it is inevitable that an incoming voice might occasionally be mis-deciphered or in-decipherable. For example, background sounds, static, noise, etc., might have masked, distorted or clouded a quality of the incoming voice where recognition/analysis is thwarted. In short, there is inefficiency in having two digitally-based AI virtual assistants communicating back-and-forth with each other using analog voice communications.

Accordingly, what are needed are arrangements for automatically detecting instances of bi-directional AI voice communications, and automatically invoking a switchover to direct digital communications representing a more efficient mode of communications for digitally-based AI entities. FIG. 2's flow chart algorithm 200 includes (in part) an example algorithm 215 conducted by at least one AI entity of the FIG. 1 example architecture, for accomplishing an example AI detection and switchover.

More particularly, after a Start, a voice communication session (e.g., telephone call) is established between a caller entity and a called entity, via an available communication framework path (operation 210). Next, algorithm 215 begins where detection is performed to determine whether an opposing entity is an AI entity (operation 220). That is, if the caller entity is conducting the FIG. 2 algorithm 215, then the caller AI entity components would perform detection to determine whether the called entity is an AI entity. In contrast, if the called AI entity is conducting the FIG. 2 algorithm 215, then called AI entity components would perform detection to determine whether the caller entity is an AI entity.

Next, operation 230 would query (based upon the operation 220 detection result) whether the opposing entity is an AI entity. If not, an AI-to-AI situation is not indicated (at least thus far) and a "No" flow branch is followed such that a present voice communication session is maintained (operation 240). Operation 242 then queries whether an AI detection period is complete.

More particularly, in some embodiments, an AI detection period may be configured to last for a predetermined limited (i.e., finite) amount of time, e.g., within the first few seconds of establishment of voice communications. In other embodiments, an AI detection period may be defined as lasting for an entirety of a voice communication session. If an AI detection period has not completed, a "No" branch is followed to flow back to operation 220 for continued detection of whether the opposing entity is an AI entity. In contrast, if the AI detection period is complete, a "Yes" branch is followed such that a present voice communication session is maintained (operation 244) as an AI-to-AI situation has not been timely detected by expiration of the AI detection period. Upon completion of the voice communication session, the communication session ends.

In further describing operation 230, if operation 230's query finds that the opposing entity IS an AI entity (i.e., an AI-to-AI situation is involved), then a "Yes" branch is followed and there is a detection of whether the present communication session is being conducted via a digital communication path (operation 250). Next, operation 260 would query (based upon the operation 250 detection result) whether the present communication session is being conducted via a digital communication path. As an example, a communication path conducted via a packet-switched network or the Internet would be a digital communication path. If digital, a "Yes" flow branch is followed such that a digital (not voice) communication session is ultimately conducted via digital communications on a digital communication path without any voice interfacing (e.g., VOICE INTERF) functions being conducted (operation 280). Upon completion of the communication session, the communication session ends.

In contrast, if operation 260's query finds that a non-digital communication path is involved, then a "No" branch is followed whereupon there is an establishment and use of a digital communication path as a replacement communication path for the prior communication path (operation 270). Then operation 280 (previously described) is performed, and upon completion, the communication session ends.

Next, this disclosure turns to describing some example approaches of how an AI entity might perform FIG. 2 operation 220's detection of whether an opposing entity is an AI entity. In order to support AI detection, AI entities in general might (in some embodiments) be configured to self-announce themselves within the communications as an AI entity, and to recognize an AI self-announcement of other AI entities when it is received.

Figure 3A:
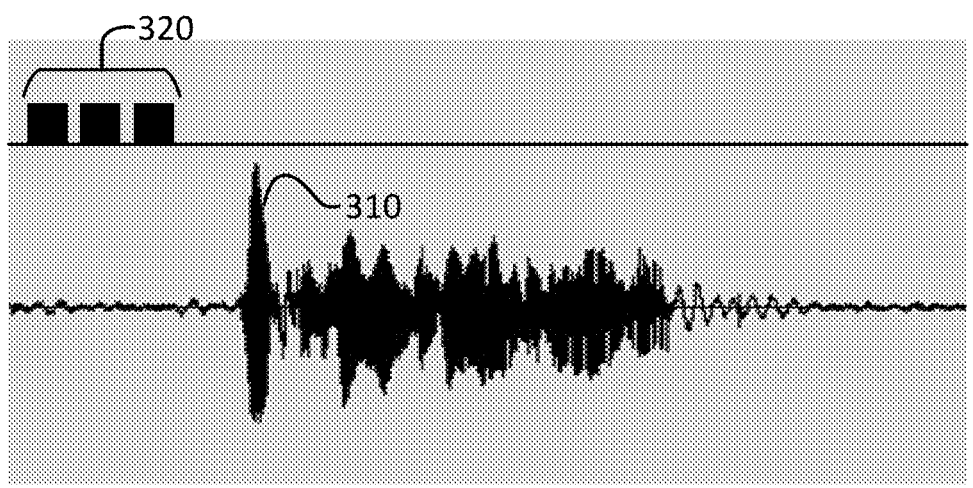
FIGS. 3A-3C illustrate example plots regarding voice communications.

More particularly, as a first example approach, AI entities might be configured (i.e., constructed) in general to include a predetermined sound signature when outputting voice communications onto any call connection. For example, FIG. 3A shows an example sound signal arrangement 300A which includes a voice signal 310 and an AI-announcing sound signal 320. While the FIG. 3A example shows three square waves as an example AI-announcing signature, implementation is in no way limited to such signature, and an infinite number of differently-arranged other types or sequencing of signatures may be used.

When such AI-announcing sound signal 320 is provided, then any AI entity conducting the FIG. 2 algorithm 215 might be configured to listen for the AI-announcing sound signal 320 when receiving voice communications. When the AI-announcing sound signal 320 is detected, then the detecting AI entity would know that the entity with which it is voice communicating is another AI entity.

As a further detail, FIG. 3A illustrates the AI-announcing sound signal 320 provided separately (i.e., out-of-band) from the voice signal 310. Such may be accomplished, for example, by the call connection being a multi-channeled call connection, and the voice signal 310 and AI-announcing sound signal 320 being provided on differing channels of the multi-channeled call connection. Use of a different channel to communicate the AI-announcing signature would be advantageous in that any sound of the AI-announcing signature may be prevented or masked from any user hearing it. That is, the AI-announcing sound signal from the AI-announcing sound signal channel would be provided only to AI-detecting components tasked with detecting whether an opposing entity is an AI entity, and not to any human listener.

Figure 3B:
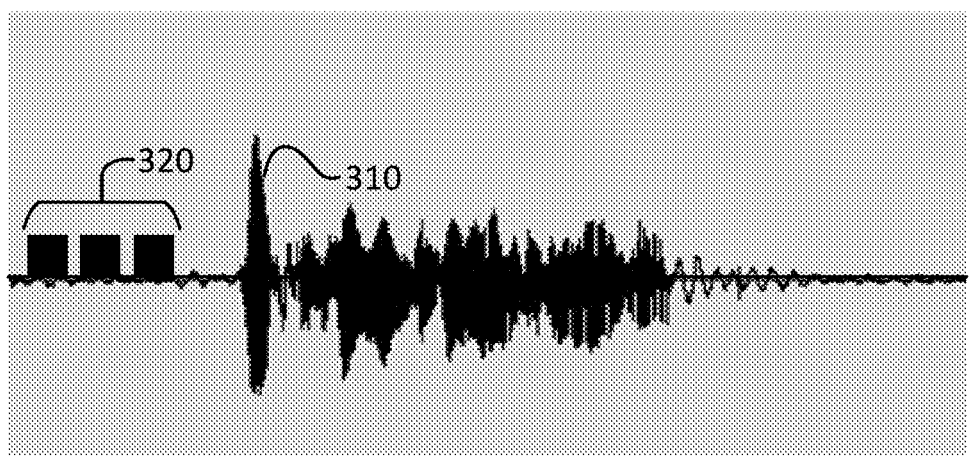

FIG. 3B illustrates another example sound signal arrangement 300B where the voice signal 310 and AI-announcing sound signal 320 are provided together (i.e., in-band) with each other, e.g., in an overlapping arrangement. Such arrangement may be somewhat disadvantageous in that any human listener participating in a voice call with an AI-entity as an opposing party would hear the AI-announcing sound signal. At minimum, hearing the AI-announcing sound signal might be an annoyance to the human listener. More disadvantageously, recognition by the human of a meaning of the AI-announcing sound signal might result in some users disconnecting the call connection in refusal of talking with an AI entity instead of a human. Such might result in a disadvantageous loss of business. For example, if a restaurant utilizes an AI entity for dining reservations, some customers may hang up on their call before requesting dining reservations, and may simply call a different restaurant which uses a human reservationist.

Figure 3C:
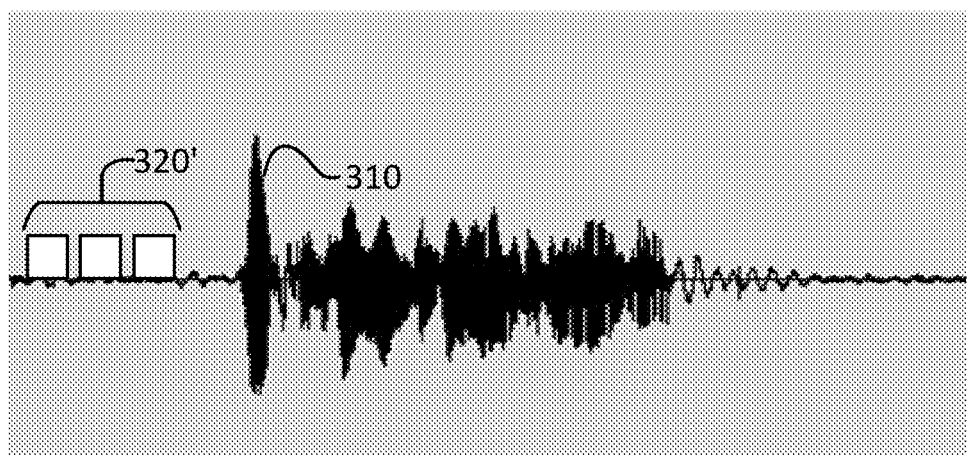

FIG. 3C illustrates another example situation arrangement 300C where the voice signal 310 and an AI-announcing sound signal 320' are provided together (i.e., in-band) with each other, but this time the signal 320' is provided in a form where the signal 320 is audibly-imperceptible to a human listener (shown representatively by the use of white blocks instead of black). For example, the signal 320' may utilize a frequency or frequencies which are outside of a hearing range of a human listener. Such arrangement is advantageous in that any sound of the AI-announcing signature may be prevented from any user hearing it. That is, the AI-announcing sound signal from the AI-announcing sound signal channel is audibly-perceptible only to AI-detecting components tasked with detecting whether an opposing entity is an AI entity, and not to any human listener.

Another example of AI-announcing could involve use of metadata provided as part of a call connection. That is, AI entities in general might be configured to self-announce themselves as an AI via inclusion of some type of self-announcing data within metadata. When such AI-announcing data is provided within metadata, then any AI entity conducting the FIG. 2 algorithm 215 might be configured to check for self-announcing data within metadata when receiving voice communications. When the AI-announcing data is detected, then the detecting AI entity would know that the entity with which it is voice communicating is another AI entity.

Figure 4A:
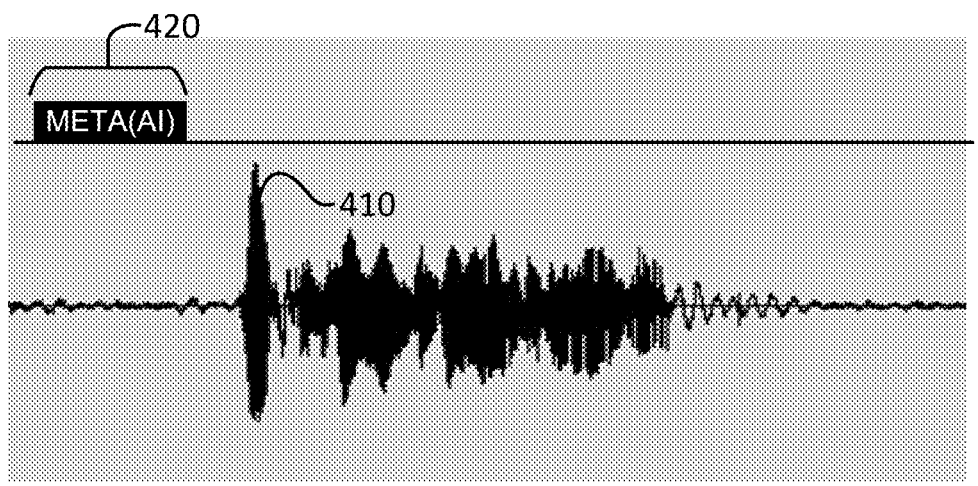
FIGS. 4A-4C illustrate other example plots regarding voice communications.

FIG. 4A illustrates example signal plot arrangement 400A where the metadata 420 including AI-announcing data (shown representatively by inclusion of the "(AI)" indicator within the metadata block 420) is provided separately (i.e., out-of-band) from the voice signal 410. Such may be accomplished, for example, by the call connection being a multi-channeled call connection as described previously. Use of a different channel to communicate the AI-announcing metadata would be advantageous in that any sound that might be generated because of AI-announcing metadata may be prevented or masked from any user hearing it. That is, the AI-announcing metadata from the metadata 420 may be provided only to AI-detecting components tasked with detecting whether an opposing entity is an AI entity, and not to any human listener.

Figure 4B:
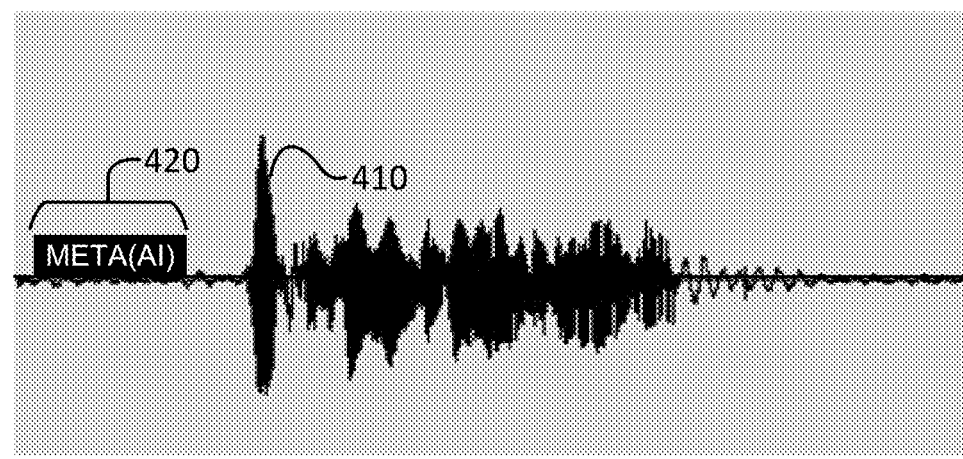

FIG. 4B illustrates another example signal plot arrangement 400B where the voice signal 410 and the metadata 420 including AI-announcing data are provided together (i.e., in-band) with each other, e.g., in an overlapping arrangement. Such arrangement may be somewhat disadvantageous in that any human listener participating in a voice call with an AI-entity as an opposing party might hear sound generated because of the metadata 420 being included in-band. At minimum, hearing metadata-induced sound might be an annoyance to the human listener.

Figure 4C:
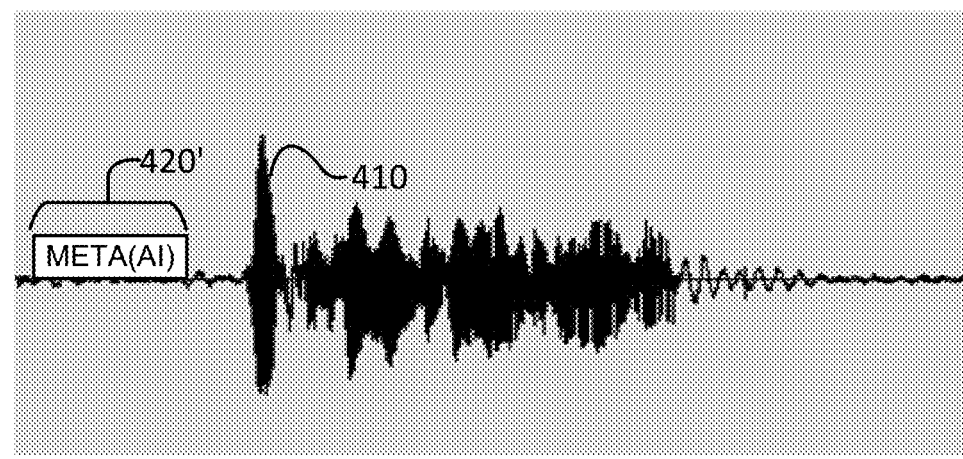

FIG. 4C illustrates another example signal plot arrangement 400C where the voice signal 410 and the metadata 420' including AI-announcing data are provided together (i.e., in-band) with each other, but this time the metadata 420' is provided in a form (shown representatively using a white metadata block instead of black) where either no noise is generated responsive to the metadata 420' or sound generated because of the metadata 420' is audibly-imperceptible to a human listener. For example, sound generated because of the metadata 420' might be a frequency or frequencies which are outside of a hearing range of a human listener. Such arrangement is advantageous in that any sound generated because of the metadata 420' may be prevented from any user hearing it. That is, any sound generated because of the metadata 420' is audibly-perceptible only to AI-detecting components tasked with detecting whether an opposing entity is an AI entity, and not to any human listener.

As to AI-announcing using metadata, in some embodiments, a predetermined label (e.g., "AI-entity" or "AI") or code (e.g., "99") may be included (e.g., embedded) within the metadata to disclose that an entity which outputted the current communication content is an AI entity. In other embodiments, a predetermined metadata location (e.g., specific bits or bytes) might be used as a flag to disclose that an entity which outputted the current communication content is an AI entity. For example, in a single-bit embodiment, a "0" set within the predetermined AI-designating bit might indicate that the entity is not an AI entity, whereas a "1" might indicate that the entity is an AI entity. On a receiving end, any AI entity conducting the FIG. 2 algorithm 215 might be configured to check metadata when receiving voice communications. When positive AI-announcing metadata is detected, then the detecting AI entity would know that the entity with which it is voice communicating is another AI entity.

Yet another example of AI-announcing could involve use of caller identification (Caller ID or CID) information provided as part of a call connection. That is, Caller ID is a telephone service, available in analog and digital telephone systems (including VoIP), that transmits a caller's telephone number to the called party's telephone equipment when the call is being set up. The caller ID service may also include the transmission of a name associated with the calling telephone number via a Caller Name CNAM service. Accordingly, in some AI-announcing embodiments, AI entities might be announced by using a telephone number having a predetermined area code (e.g., "999") which is pre-agreed-to within the telephone and AI industries as being reserved for AI-entity usage. In other embodiments, a predetermined name such as "AI-Entity" may be transmitted together with a telephone number as part of the caller name CNAM information. In still other embodiments, both the AI-reserved area code and the "AI-Entity" designating name may be used.

When Caller ID and/or CNAM information is received as part of an incoming call, then any AI entity conducting the FIG. 2 algorithm 215 might be configured to check for an AI-reserved area code or an "AI-Entity" designating name. When either is detected, then the detecting AI entity would know that the entity with which it is voice communicating is another AI entity.

Still another example of AI-announcing could involve Voice over Internet Protocol (VoIP; also called voice over IP or IP telephony) technology, where AI-announcing information is included within VoIP packets. That is, VoIP is a methodology and a group of technologies for the delivery of voice communications over Internet Protocol (IP) networks, such as the Internet, rather than via PSTN. As to packets, a last field in the VoIP packet structure is the payload field which carries the encoded voice data, whereas preceding fields contain various other information. In some embodiments, a predetermined name such as "AI Entity", or code (e.g., "99") or flag (e.g., "0"=non-AI-entity; "1"=AI-entity) may be embedded at a predetermined location of one of the preceding fields, as AI-announcing information.

Figure 5:
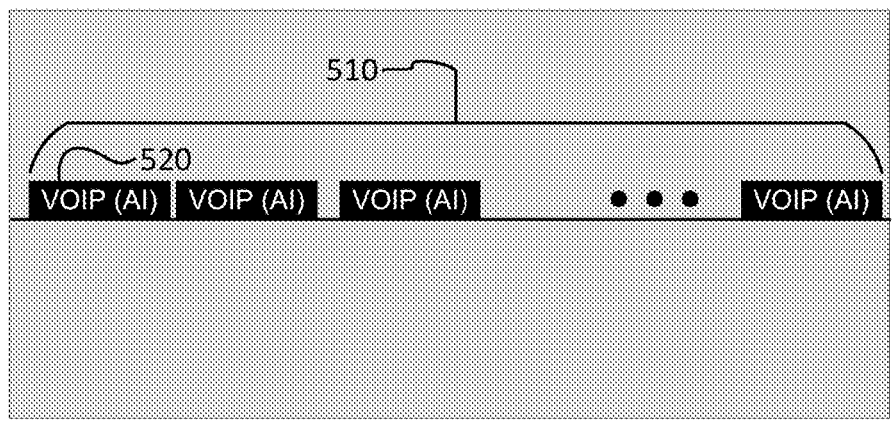
FIG. 5 illustrates still another example plot regarding voice communications.

FIG. 5 illustrates an example VoIP signal arrangement 500 where a stream 510 of VoIP data includes a plurality of VoIP packets 520. The notation "(AI)" included within any FIG. 5 packet is used to representatively designate that AI-announcing information is included with that packet. Although the FIG. 5 example illustrates "(AI)" information included within every packet, implementation is by no means limited to including "(AI)" information within every packet. More particularly, a fewer number of packets, or even a single (e.g., leading) packet might contain the "(AI)" information. In some embodiments, the "(AI)" information might be included within periodic packets (e.g., every fifth packet).

When VoIP packets are received as part of a voice call, then any AI entity conducting the FIG. 2 algorithm 215 might be configured to check VoIP packet field information to determine whether "(AI)" information is included within any packet, and if yes, whether the "(AI)" information indicates that the VoIP packets are from an AI entity. If a positive indication is found, then the detecting AI entity would know that the entity with which it is voice communicating is another AI entity.

As an aside, previously an example was described where FIG. 1's digital call connection 186 was assumed to be a digital call connection and was effectively modified to a shortened call connection 186' via disabling of the VOICE INTERF 118 and the VOICE INTERF 158 applications. A VoIP call which involves connection over IP networks, such as the Internet (rather than PSTN), represents a digital call connection. Accordingly, some embodiments may be configured to maintain an original VoIP call connection and disable operation of the VOICE INTERFs 118, 158 applications to handle subsequent packets as containing digital (non-voice) data content rather than VoIP (voice) data content.

Discussion turns next to some embodiments where there may be no AI-announcing information provided by any AI entity. More particularly, in some embodiments, a catalog of known "AI voices" may be compiled and maintained, for example, by an AI association or clearinghouse, for use as standard AI voices in AI communications. That is, the AI voice catalog may be stored in, and available (e.g., free of charge; per licensing; etc.) through a centralized location such as FIG. 1's AI Support Server 160 and Storage 164.

AI entities in general may be configured to access and utilize a standard AI voice selected from the AI voice catalog, for their voice outputting. Then, any AI entity conducting the FIG. 2 algorithm 215 might be configured to compare a voice heard on a call connection to each of the known standard AI voices within the AI voice catalog to look for a match. Comparison may include comparing voice prints for "signatures". Further, being "heard" and "a voice" as used in this description is not limited to a voice spectrum which is humanly perceptible, and instead, being "heard" and "a voice" may more broadly encompass spectrum which is beyond human perceptibility. For example, being "heard" and "a voice" may more broadly encompass spectrum which is machine perceptible. When a standard AI voice match is detected, then the detecting AI entity would know that the entity with which it is voice communicating is another AI entity.

In other embodiments, a catalog of predetermined known "AI phrases" is compiled and maintained, for example, by an AI association or clearinghouse, for use as standard AI phrases in AI communications. That is, the AI phrase catalog may be stored in, and available (e.g., free of charge; per licensing; etc.) through a centralized location such as FIG. 1's AI Support Server 160 and Storage 164. One example salutary phrase might be "Greetings humanoid." AI entities in general may be configured to access and utilize standard AI phrases selected from the AI phrase catalog. Then, any AI entity conducting the FIG. 2 algorithm 215 might be configured to compare phrases heard on a call connection to each of the standard AI phrases within the AI phrase catalog to look for a match. When a standard AI phrase match is detected, then the detecting AI entity would know that the entity with which it is voice communicating is another AI entity.

Figure 6:
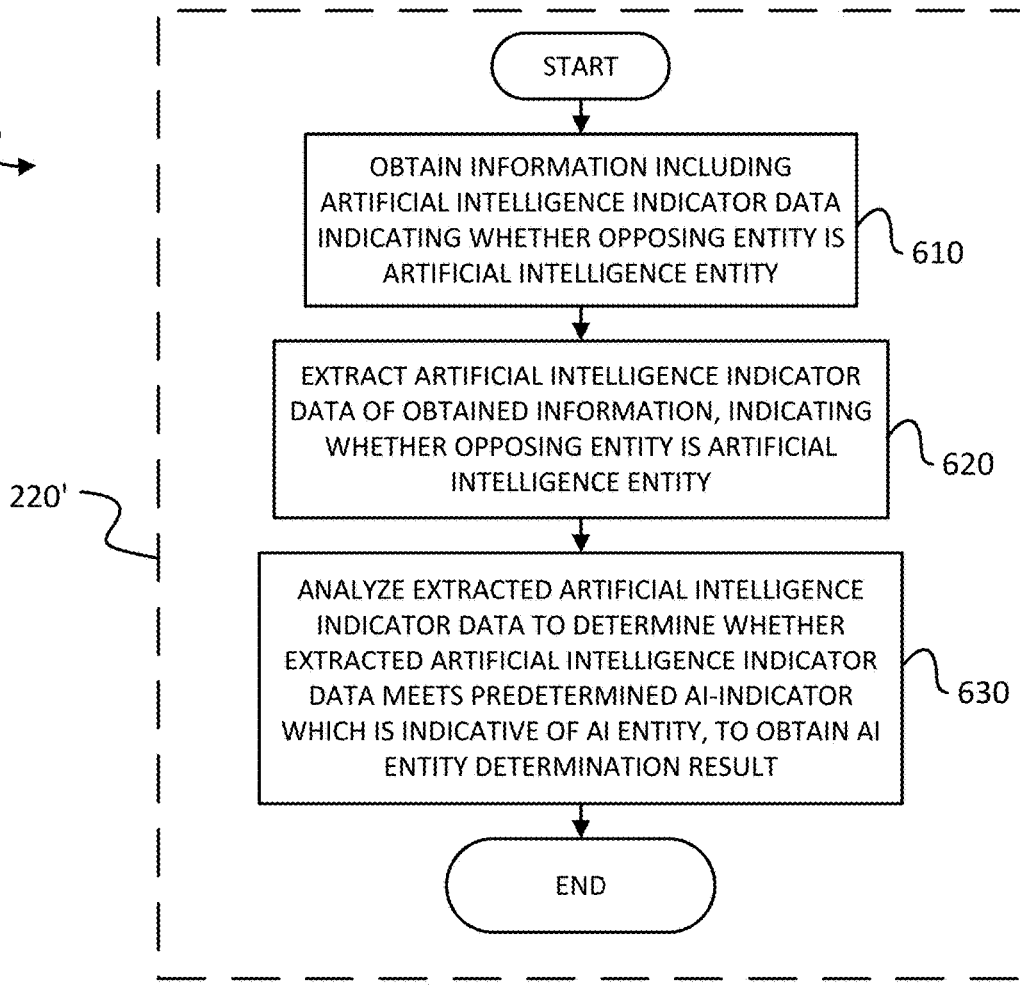
FIG. 6 illustrates an example flow chart algorithm substitutable for a portion of the FIG. 2 flow chart algorithm.

Turning now to more detailed descriptions of portions of the FIG. 2 flow algorithm, FIG. 6 illustrates a more detailed example flow chart algorithm 600 (including operations 220') substitutable for, and serving as a basis for further description of, operation 220. In order to determine whether an opposing entity is an AI entity, a Start is followed by an operation 610 obtaining information which includes AI indicator data indicative of whether an opposing entity is an AI entity. Again, as non-limiting examples, such information might be obtained from one or more of: signature sound signals, metadata content, Caller ID (CID) content, Caller Name (CNAM) content, VOIP content, cataloged AI-voice-containing sound signals, cataloged AI-phrase-containing sound signals, etc., as mentioned above during the FIGS. 3A-3C, 4A-4C and 5 discussions.

Thereafter, operation 620 is performed to extract AI indicator data from the obtained information, indicative of whether an opposing entity is an AI entity. In line with the above information examples, non-exhaustive AI indicator data might include: possible signature-containing-portions of sound signals, predetermined metadata portions, predetermined Caller ID (CID) portions, predetermined Caller Name (CNAM) portions, predetermined VOIP portions, sampled possible-AI-voice-containing sound portions, sampled possible-AI-phrase-containing sound portions, etc.

Finally, operation 630 is performed to analyze the extracted AI indicator data to determine whether extracted artificial intelligence indicator data meets any predetermined AI indicators which are indicative of an AI entity, thereby to obtain an AI entity determination result. Analyzing the extracted AI indicator data may be conducted via one or more of the analyses described above including with respect to FIGS. 3A-3C, 4A-4C and 5. Once a result is obtained, the algorithm 220' is ended, and continued operation passes to FIG. 2's operation 230 which utilizes the result in its query.

Next, FIG. 7 illustrates a more detailed example flow chart algorithm 700 (including operations 250') substitutable for, and serving as a basis for further description of, operation 250 of the FIG. 2 flow chart algorithm. In order to perform detection of whether the present communication session is being conducted via a digital communication path, a Start is followed by an operation 710 obtaining information which includes communication path data indicating a type of a current communication path. For example such information might be: property information associated with a communication path of the communication session; a protocol followed in conducting the communication session along the present communication path; etc.

Operation 720 then extracts the communication path data from the obtained information, with the communication path data being indicative of a type of current communication path. Non-exhaustive communication path data might be: a "packet-switched" setting; an "IPv4" setting; an "IPv6" setting; a "PSTN" setting; etc.

Finally, operation 730 analyzes the extracted communication path data to determine whether the current communication path is a known type of digital communication path, thereby resulting in a digital communication path determination result. For example, analysis of a "packet-switched" setting, "IPv4" setting or "IPv6" setting would obtain a result indicative that a current communication path is a digital communication path. In contrast, analysis of a "PSTN" setting would obtain a result indicative that a current communication path is NOT a digital communication path. Once a result is obtained, the algorithm 250' is ended, and continued operation passes to FIG. 2's operation 260 which utilizes the result in its query.

Description turns next to approaches for establishing a new digital communication path as a replacement communication path, as called for in FIG. 2's operations 270. More particularly, in some embodiments, the AI 116 and AI 156 applications (as AI entities) may continue to voice communicate with each other for a while after detection is made of an opposing AI entity on the other end of the call, in order to exchange addressing information to describe an address useable to connect to set up a new digital communication path to further communicate. Example addressing information might be an IPv4 address, IPv6 address, or a domain name address.

Given that IPv4 and IPv6 addresses are numerical (e.g., 172.16.254.1), one of the AI entities (e.g., the called restaurant AI entity) might simply voice the numbers of its IP address, such as "One seven two dot one six dot two five four dot one." Alternatively, given that a domain name address is formed of alphanumeric characters (e.g., www.restaurantX.com/reservations), the AI entity might simply voice the alphanumeric characters of its domain name address, such as "www.restaur . . . ".

Responsive to exchange of addressing information, the AI entity receiving the addressing information (e.g., the calling AI entity seeking a dining reservation) would then utilize such addressing information to establish a digital communication path (such as shown by FIG. 1's communication path 188 and continue with direct digital communications between the two AI entities. Alternatively, the addressing information might connect the calling AI entity 116 to a third-party AI entity 196 of a third-party (e.g., dining reservation) hosting site maintained at a third-party server provider type of facility 191 (e.g., server farm). Such may be illustrated by the FIG. 1 communication path 189 (double-short-dash-single-dot line). The original voice communication path (e.g., FIG. 1's communication path 186) may be disconnected when: addressing information exchange is successful; when the digital communication path is established; etc.

In addition to exchanging addressing information, other types of information might also be exchanged during the voice communications. In some embodiments, a token may be exchanged, where the token might be useable for: identifying either or both of the AI entities; authentication in establishing the digital communication path; identifying the original voice communication session; a format or protocol which should be used for the direct digital communications; a nature of the original voice communication query (e.g., reservation request); business hours for contacting the AI entity; etc. Implementation of embodiments of the invention is by no means limited to the above-mentioned types of exchanged information.

In some other embodiments, there may be no exchange of addressing or other information between the two AI entities in the voice call connection once it is determined that an AI-entity-to-AI-entity call situation exists. More particularly, in some embodiments the calling AI entity (for example) might be configured to simply disconnect the voice communication session, and then use an alternative approach to obtain information which is helpful to establish a digital communication session to finish communications digitally.

More particularly, in some embodiments, the calling AI entity (for example) might be configured to search the webpage of the called (e.g., restaurant) entity to obtain an IP address or domain name address (and other information such as described above) for establishing a digital communication session to perform direct digital communications with the called entity. Thereafter, the calling AI entity may use the obtained IP address and other information to establish digital communication session and finish the communications with direct digital communications.

In other embodiments, an AI association or clearing house might solicit and compile a database of contact information (including direct digital communication path instructions) for large numbers of AI entities, and make that available for reference. That is, the database may provide a cross-reference, for example of: AI entity name; AI entity telephone number; AI entity IP address or domain name; AI entity direct digital communication path address; AI entity communication format and/or protocol; etc. Implementation of embodiments of the invention is by no means limited to the above-mentioned types of exchanged information.

The calling AI entity (for example) may then be configured to: use a predetermined Internet address to contact the database-hosting site (e.g., the FIG. 1 AI support server 160); and then utilize the known information of the called (e.g., restaurant) entity (such as the AI entity name; AI entity telephone number; etc.) to poll the database and obtain cross-reference information such as the AI entity direct digital communication path address, AI entity communication format and/or protocol, etc.; and then utilize the obtained information to establish a digital communication session and finish the communications with the called (restaurant) AI entity via direct digital communications.

In still other embodiments, the called (restaurant) AI entity may be configured to text IP address or domain name address (and other information such as described above) for establishing a digital communication session back to the telephone number of the calling AI entity, with the telephone number being gleaned from metadata, Caller ID, etc. of an incoming call. Thereafter, the calling AI entity may use the obtained IP address and other information from the text to establish digital communication session and finish the communications with direct digital communications.

In line with the above descriptions, FIG. 8 illustrates a more detailed example flow chart algorithm 800 (including operations 270') substitutable for, and serving as a basis for further description of, operation 270 of the FIG. 2 flow chart algorithm. That is, in order to establish a digital communication path as a replacement communication path for the prior communication path, a Start is followed by an operation 810 obtaining information which includes digital connection setup data providing at least a connectable address for setting up a digital connection for direct digital communications. Again, as non-limiting examples, such information might be obtained from one or more of: voice-communicated information; webpage-obtained information; database-obtained information; text-message-obtained information; etc., as mentioned above. Implementation of embodiments of the invention is by no means limited to the above-mentioned information.

Thereafter, operation 820 is performed to extract digital connection setup data from the obtained information, with the extracted data being useable for (e.g., guiding) setting up of a digital connection for direct digital communications. Again, non-exhaustive digital connection setup data might include: an IPv4 address; an IPv6 address; a domain name address; a token that might be useable for: identifying either or both of the AI entities; authentication in establishing the digital communication path; identifying the original voice communication session; a format or protocol which should be used for the direct digital communications; business hours for contacting the AI entity; etc.

Finally, operation 830 is performed to use the extracted digital connection setup data to establish a digital connection as a replacement connection. As an example, a caller AI entity may establish a digital connection by utilizing an extracted IPv6 address and extracted protocol. Once a digital connection is established, the algorithm 270' is ended, and continued operation passes to FIG. 2's operation 280 for conducting the digital communication session.

Description turns momentarily to FIG. 1 to describe a switching-over regarding two digital communication connections or paths. More particularly, in considering the third example's call connection 186, if the call connection 186 is determined as a digital (e.g., a packet-switched or Internet) communication path via FIG. 2's operation 260, then the "Yes" flow branch is followed to operation 280, but in this case, the call connection 186 is still being used inefficiently in that it includes handling via both the VOICE INTERF 118 and the VOICE INTERF 158 applications.

In order to effect operation 280 so that a digital (not voice) communication session is thereafter conducted via the digital communication path without any voice interfacing (e.g., VOICE INTERF) functions being conducted, steps may be taken to remove or disable both the VOICE INTERF 118 and the VOICE INTERF 158 applications from further handling content of a continuing communication session. Of course, to remove or disable both the VOICE INTERF 118 and the VOICE INTERF 158 applications from opposing ends of the call connection, there may be some type of coordination or hand-shaking performed between the two AI entities to synchronize regarding removal or disabling, and then communicating without voice. Otherwise communications between the two AI entities might experience failure at least temporarily until their modes of operation are synchronized.

FIG. 9 illustrates a more detailed example flow chart algorithm 900 (including operations 280') substitutable for, and serving as a basis for further description of, operation 280 of the FIG. 2 flow chart algorithm. In order to conduct a digital (not voice) communication session thereafter via the digital communication path without any voice interfacing (e.g., VOICE INTERF) functions being conducted, a Start is followed by an operation 910 asking a query of whether a voice interface (e.g., VOICE INTERF) is currently set operational to synthesize an output voice and to process a voice input of a communication. If not presently operational (i.e., the voice interfacing is not handling communications), a "No" branch is followed to conduct the digital communications to complete a communication session (operation 930). Upon completion of the voice communication session, the communication session ends.

In contrast, if operation 910's query determines that the voice interfacing is presently operational (i.e., the voice interfacing IS handling communications), a "Yes" branch is followed where a disabling of operation of the voice interface (e.g., VOICE INTERF) for allowing digital communications without voice interface processing, is effected. Thereafter, operation 930 (previously described) is conducted.

Disabling (or removing) may be accomplished in numerous differing ways. For example: turning the applications off; routing communication content through a differing route or processing sequence to avoid such applications; setting programming flags or switches so that such applications are disabled; etc. Such disabling or removing may, in some embodiments, be able to be accomplished without disconnection of the call connection 186.

As a result, the call connection 186 is still operable but has been effectively modified as shown illustratively by FIG. 1's changed, shortened, transformed, etc., call connection 186' (lighter-shaded long-dashed-short-dashed line). Thereafter, more efficient direct digital communications are conducted between the AI 116 and AI 156 applications along the call connection 186', without the inefficiencies caused via handling with the VOICE INTERF 118 and VOICE INTERF 158 applications (FIG. 2 operation 280).

As a second digital communication connection or path example, if the present call connection (e.g., FIG. 1's call connection 186) is determined (e.g., via FIG. 2's operation 260) not to be a digital communication path (e.g., is a PSTN connection) and the "No" flow branch is followed, some embodiments may establish a wholly new digital communication connection to replace the non-digital call connection 186. FIG. 1 shows a new digital communication connection 188 (short-dash-double-dot-line) allowing direct digital communications between the AI 116 and AI 156 applications without involving the VOICE INTERF 118 and VOICE INTERF 158 applications. Given that communications will be conducted via the new digital communication connection, the prior voice call connection may be released (e.g., disconnected) to free up system resources.

Next, FIG. 10 illustrates an embodiment of a storage medium 1000. Storage medium 1000 may include any non-transitory computer-readable storage medium or machine-readable storage medium, such as an optical, magnetic or semiconductor storage medium. In various embodiments, storage medium 1000 may include an article of manufacture. In some embodiments, storage medium 1000 may store computer-executable instructions, such as computer-executable instructions to implement one or more of logic flows or operations described herein, such as with respect to flow algorithms 200 of FIG. 2, 600 of FIG. 6, 700 of FIG. 7, 800 of FIG. 8 and 900 of FIG. 9. Storage medium 1000 may also store further computer-executable instructions, such as computer-executable instructions to implement other logic flows or operations, and may store data.

Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
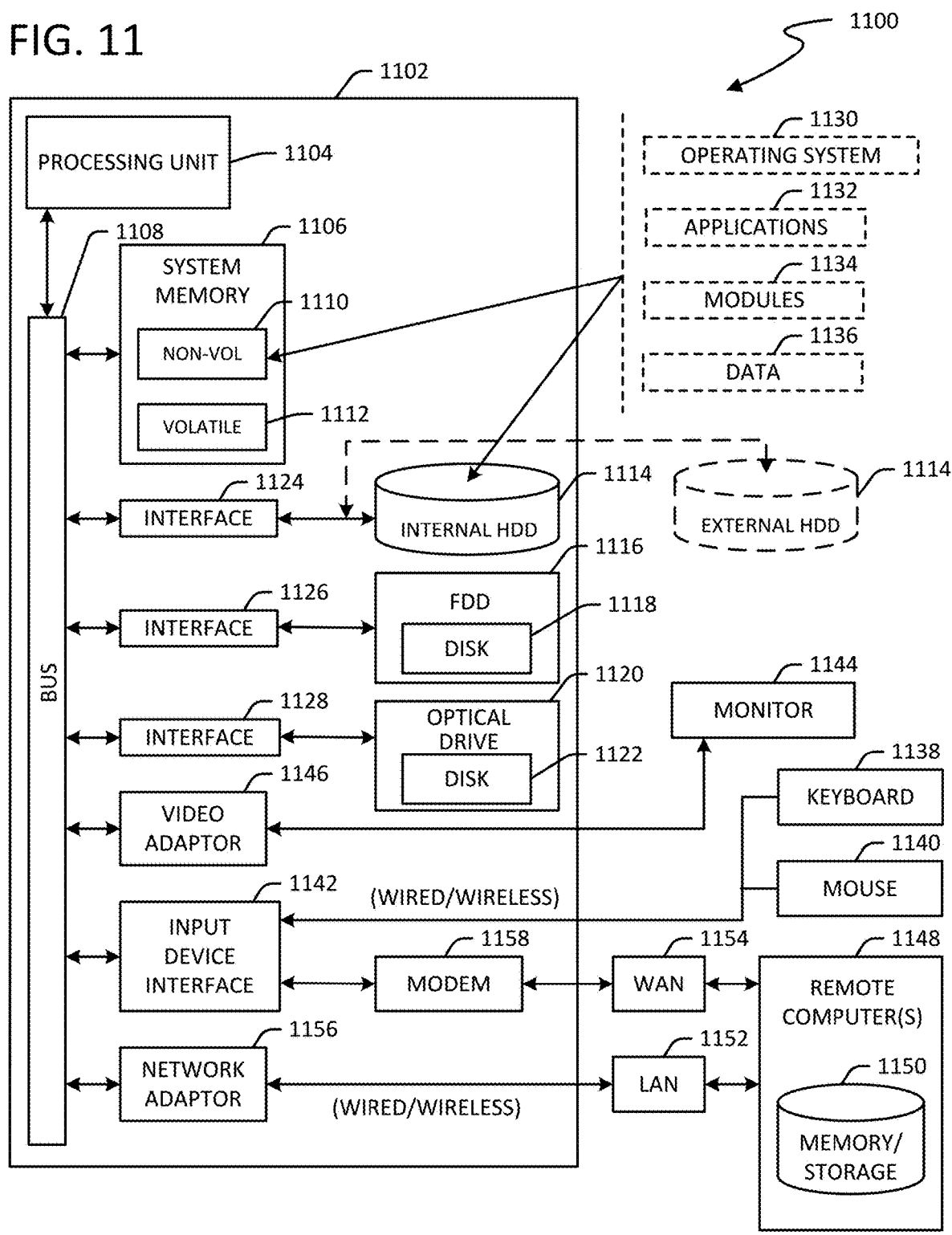
FIG. 11 illustrates an example embodiment of a computing architecture such as a server.

FIG. 11 illustrates an embodiment of an exemplary computing architecture 1100 that may be suitable for implementing any of the components (e.g., computers, servers, client devices, etc.) of various embodiments as described anywhere within this disclosure. In various embodiments, the computing architecture 1100 may include or be implemented as part of an electronic device. In some embodiments, the computing architecture 1100 may be representative, for example, of a processor server that implements one or more components of the FIG. 1 system, such as the above-described components. In some embodiments, computing architecture 1100 may be representative, for example, of a computing device that implements one or more components of the client 110, called party server 150, AI support server 160 and third-party hosting server 190 arrangements. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 includes a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1594 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the aforementioned servers of the present disclosure.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 994 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

It should be appreciated that the example embodiments shown in the block diagram of several FIGS. may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

In the context of the present disclosure, unless expressly provided otherwise, the words "first", "second", "third", etc. have been used as adjectives only for the purpose of allowing for distinction between the nouns that they modify from one another, and not for the purpose of describing any particular relationship between those nouns.

As may or may not have been mentioned previously, various features, operations, etc. of this invention may be practiced "simultaneously", "concurrently" or "parallelly". As used within a content of this invention, the term 'simultaneous' means that two things (e.g., collecting; analyzing, etc., of differing information) happen at the same time (i.e., at least partially occur or overlap in time), while the term 'concurrent' means that the two things may occur during the same period of time, but do not necessarily happen at the same time. Concurrent is the broader term, and may include instances of things occurring simultaneously. If two things (e.g., collecting; analyzing, etc., of differing information) overlap in time partially but not completely, the things may be described as occurring concurrently, while the overlapping portion may be described as occurring simultaneously. Further, the term "parallel" means that two things occur along two differing paths or via differing operations. Parallel may include instances which occur simultaneously, instances which occur concurrently, and/or instances occurring at wholly differing time periods.

In this disclosure, the term "real time" refers to a time scale that is substantially simultaneous to an item or instance which provoked a subsequent action. In contrast, the term "near real time" refers to a time scale that is slower than the time scale referred to as "real time," for example by about one or more orders of magnitude, or by requiring a finite amount of time (e.g., milliseconds) rather than being substantially simultaneous.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method of negotiating direct digital communication between artificial intelligence (AI) entities, comprising:
    recognizing, by an AI entity on a first side of a bi-directional voice communication session, a predetermined indicator provided from an opposing side of the bi-directional voice communication session, the predetermined indicator indicative of a second AI entity on the opposing side conducting the bi-directional voice communication session at a called-number;
    terminating the bi-directional voice communication session between the AI entity and the second AI entity after recognition of the second AI entity on the opposing side;
    responsive to recognition of the second AI entity, utilizing the called-number to poll a predetermined look-up facility to determine connection information for a direct digital communication session between the AI entity and the second AI entity;
    utilizing the connection information to establish the direct digital communication session between the AI entity and the second AI entity; and
    utilizing the direct digital communication session to communicate non-voice digital data without voice interface functionality.

2. The method as claimed in claim 1, wherein:
    the bi-directional voice communication session includes an in-band communication channel and out-of-band communication channel; and
    the predetermined indicator is recognized from the in-band communication channel.

3. The method as claimed in claim 2, wherein:
    the predetermined indicator recognized from the in-band communication channel is at least one item selected from a list of:
    a predetermined tone;
    a predetermined tone which is imperceptible to human hearing;
    a predetermined audible pattern;
    a predetermined AI voice;
    a predetermined AI salutation; and
    a predetermined AI phrase.

4. The method as claimed in claim 1, wherein:
    the bi-directional voice communication session includes an in-band communication channel and out-of-band communication channel; and
    the predetermined indicator is recognized from the out-of-band communication channel.

5. The method as claimed in claim 4, wherein:
    the predetermined indicator recognized from the out-of-band communication channel is at least one item selected from a list of:
    a predetermined caller identification (ID) number;
    a predetermined caller ID string portion;
    a predetermined caller ID prefix;
    a predetermined caller ID area code;
    a predetermined caller ID text sequence;
    a predetermined text sequence; and
    a predetermined header portion.

6. The method as claimed in claim 1, wherein:
    the connection information for the direct digital communication session, is at least one of listed items of:
    a uniform resource locator (URL) useable to establish the direct digital communication session;
    a token useable to authorize the direct digital communication session;
    an identification (ID) token to identify at least one of the AI entity and the second AI entity; and
    a protocol to be used in conducting the direct digital communication session.

7. The method as claimed in claim 1, wherein:
    the called-number is a called-telephone-number; and
    the predetermined look-up facility utilizes the called-telephone-number and a look-up table (LUT) to determine the connection information for the direct digital communication session between the AI entity and the second AI entity.

8. The method as claimed in claim 1, wherein:
    the predetermined look-up facility is at least one of listed facilities of:
    a predetermined native look-up facility maintained as a component of the AI entity;
    a predetermined remote look-up facility maintained remote from the AI entity; and
    a predetermined centralized look-up facility accessible via a predetermined URL.

9. A non-transitory machine-readable medium containing instructions, which when executed by a processor, cause the processor to perform operations, the operations to:
    recognize, by an artificial intelligence (AI) entity on a first side of a bi-directional voice communication session, a predetermined indicator provided from an opposing side of the bidirectional voice communication session, the predetermined indicator indicative of a second AI entity on the opposing side conducting the bi-directional voice communication session at a called-number;
terminate the bi-directional voice communication session between the AI entity and the second AI entity after recognition of the second AI entity on the opposing side;
responsive to recognition of the second AI entity, utilize the called-number to poll a predetermined look-up facility to determine connection information for a direct digital communication session between the AI entity and the second AI entity;
utilize the connection information to establish the direct digital communication session between the AI entity and the second AI entity; and
utilize the direct digital communication session to communicate non-voice digital data without voice interface functionality.

10. The machine-readable medium of claim 9, wherein:
the bi-directional voice communication session includes an in-band communication channel and out-of-band communication channel; and
the predetermined indicator is recognized from the in-band communication channel.

11. The machine-readable medium of claim 10, wherein:
the predetermined indicator recognized from the in-band communication channel is at least one item selected from a list of:
a predetermined tone;
a predetermined tone which is imperceptible to human hearing;
a predetermined audible pattern;
a predetermined AI voice;
a predetermined AI salutation; and
a predetermined AI phrase.

12. The machine-readable medium of claim 9, wherein:
the bi-directional voice communication session includes an in-band communication channel and out-of-band communication channel; and
the predetermined indicator is recognized from the out-of-band communication channel.

13. The machine-readable medium of claim 12, wherein:
the predetermined indicator recognized from the out-of-band communication channel is at least one item selected from a list of:
a predetermined caller identification (ID) number;
a predetermined caller ID string portion;
a predetermined caller ID prefix;
a predetermined caller ID area code;
a predetermined caller ID text sequence;
a predetermined text sequence; and
a predetermined header portion.

14. The machine-readable medium of claim 9, wherein:
the connection information for the direct digital communication session, is at least one of listed items of:
a uniform resource locator (URL) useable to establish the direct digital communication session;
a token useable to authorize the direct digital communication session;
an identification (ID) token to identify at least one of the AI entity and the second AI entity; and
a protocol to be used in conducting the direct digital communication session.

15. The machine-readable medium of claim 9, wherein:
the called-number is a called-telephone-number; and
the predetermined look-up facility utilizes the called-telephone-number and a look-up table (LUT) to determine the connection information for the direct digital communication session between the AI entity and the second AI entity.

16. The machine-readable medium of claim 9, wherein:
the predetermined look-up facility is at least one of listed facilities of:
a predetermined native look-up facility maintained as a component of the AI entity;
a predetermined remote look-up facility maintained remote from the AI entity; and
a predetermined centralized look-up facility accessible via a predetermined URL.

17. A system, comprising: one or more processors; a non-transitory machine-readable storage containing instructions, which when executed by the one or more processors, cause the one or more processors to perform operations, the operations to:
recognize, by an artificial intelligence (AI) entity on a first side of a bi-directional voice communication session, a predetermined indicator provided from an opposing side of the bidirectional voice communication session, the predetermined indicator indicative of a second AI entity on the opposing side conducting the bi-directional voice communication session at a called-number;
terminate the bi-directional voice communication session between the AI entity and the second AI entity after recognition of the second AI entity on the opposing side;
responsive to recognition of the second AI entity, utilize the called-number to poll a predetermined look-up facility to determine connection information for a direct digital communication session between the AI entity and the second AI entity;
utilize the connection information to establish the direct digital communication session between the AI entity and the second AI entity; and
utilize the direct digital communication session to communicate non-voice digital data without voice interface functionality.

18. The system of claim 17, wherein:
the connection information for the direct digital communication session, is at least one of listed items of:
a uniform resource locator (URL) useable to establish the direct digital communication session;
a token useable to authorize the direct digital communication session;
an identification (ID) token to identify at least one of the AI entity and the second AI entity; and
a protocol to be used in conducting the direct digital communication session.

19. The system of claim 17, wherein:
the called-number is a called-telephone-number; and
the predetermined look-up facility utilizes the called-telephone-number and a look-up table (LUT) to determine the connection information for the direct digital communication session between the AI entity and the second AI entity.

20. The system of claim 17, wherein:
the predetermined look-up facility is at least one of listed facilities of:
a predetermined native look-up facility maintained as a component of the AI entity;
a predetermined remote look-up facility maintained remote from the AI entity; and a predetermined centralized look-up facility accessible via a predetermined URL.

\* \* \* \* \*